US010711016B1

(12) United States Patent
Mecking et al.

(10) Patent No.: US 10,711,016 B1
(45) Date of Patent: *Jul. 14, 2020

(54) FUNCTIONALIZED ALUMINUM REAGENTS

(71) Applicant: The Goodyear Tire & Rubber Company, Akron, OH (US)

(72) Inventors: Stefan Mecking, Constance (DE); Margaret Flook Vielhaber, Kent, OH (US); Inigo Göttker-Schnetmann, Constance (DE); Philip Kenyon, Oxford (GB)

(73) Assignee: The Goodyear Tire & Rubber Company, Akron, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/400,066

(22) Filed: May 1, 2019

(51) Int. Cl.
*C07F 5/06* (2006.01)
*B01J 31/02* (2006.01)
*C08F 36/04* (2006.01)
*C08K 5/56* (2006.01)

(52) U.S. Cl.
CPC ........... *C07F 5/062* (2013.01); *B01J 31/0235* (2013.01); *C08F 36/04* (2013.01); *C08K 5/56* (2013.01)

(58) Field of Classification Search
CPC ........ C07F 5/061; C07F 5/062; B01J 31/0235
See application file for complete search history.

(56) References Cited

U.S. PATENT DOCUMENTS

| | | |
|---|---|---|
| 3,332,919 A | 7/1967 | Marktscheffel et al. |
| 5,395,891 A | 3/1995 | Obrecht et al. |
| 5,672,639 A | 9/1997 | Corvasce et al. |
| 6,127,488 A | 10/2000 | Obrecht et al. |
| 6,133,364 A | 10/2000 | Obrecht et al. |
| 6,207,757 B1 | 3/2001 | Obrecht et al. |
| 6,242,534 B1 | 6/2001 | Obrecht et al. |
| 6,372,857 B1 | 4/2002 | Obrecht et al. |
| 6,608,125 B2 | 8/2003 | Cruse et al. |
| 2003/0130535 A1 | 7/2003 | Deschler et al. |

FOREIGN PATENT DOCUMENTS

| | | | |
|---|---|---|---|
| FR | 1410867 A * | 9/1965 | ................ C07F 1/00 |
| WO | 2010139450 A1 | 12/2010 | |
| WO | 2011014533 A1 | 2/2011 | |
| WO | 2017189120 A8 | 6/2018 | |

OTHER PUBLICATIONS

Bahr et al. Chemische Berichte, 88, 251-264, 1955; CA 50: 8090 1956. CAPLUS Abstract provided.*
Zakharkin et al. Izvestiya Akademii Nauk SSSR, Seriya Khimicheskaya, 1039-43, 1960; CA 54: 127938, 1960. CAPLUS Abstract provided.*
Tolstikov et al. Zhurnal Organicheskoi Khimii, 27(7), 1497-504, 1991; CA 116: 214787, 1992. CAPLUS Abstract provided.*
Tanaka et al. European Journal of Organic Chemistry, 2014(6), 1167-1171; CA 160: 606461, 2014. CAPLUS Abstract provided.*
Merino et al. Journal of Organic Chemistry, 2009, 74(7), 2824-2831; CA 150: 330040, 2009. CAPLUS Abstract provided.*
Abby R. O'Connor, et al., The Mechanism of Polymerization of Butadiene by "Ligand-Free" Nickel(II) Complexes, J. Am. Chem. Soc., 2007, pp. 4142-4143, 129.
Cottet, et al., Copper-Catalyzed Asymmetric Conjugate Addition of Alkenyl- and Alkylalanes to a,β-Unsaturated Lactams, Organic Letters, Department of Organic Chemistry, University of Geneva, Jan. 29, 2013, pp. 828-831, vol. 15, No. 4, American Chemical Society.
Cueny, et al., Selective Quench-Labeling of the Hafnium-Pyridyl Amido-Catalyzed Polymerization of 1-Octene in the Presence of Trialkyl-Aluminum Chain-Transfer Reagents, ACS Catal. 2018, 8, 2018, pp. 11605-11614, Department of Chemistry, University of Wisconsin, Madison.
Eisch, Hydroalumination of C=C and C≡C, Reduction: Selectivity, Strategy & Efficiency in Modern Organic Chemistry, 1991, vol. 8.
Evans, et al., Lanthanide Metallocene Reactivity with Dialkyl Aluminum Chlorides: Modeling Reactions Used to Generate Isoprene Polymerization Catalysts, Organometallics, 2005, pp. 570-579, 24, American Chemical Society.
Gao, et al., α-Selective Ni-Catalyzed Hydroalumination of Aryl- and Alkyl-Substituted Terminal Alkynes: Practical Syntheses of Internal Vinyl Aluminums, Halides, or Boronates, Department of Chemistry, Merkert Chemistry Center, Jul. 15, 2010, pp. 10961-10963, 132, J. Am. Chem. Soc.
German, et al., Telechelic Polyethylene from Catalyzed Chain-Growth Polymerization, Angew. Chem. Int. Ed. 2013, 2013, pp. 3438-3441, 52, Wiley-VCH Verlag GmbH & Co. KGaA, Weinheim.

(Continued)

*Primary Examiner* — Venkataraman Balasubramanian
(74) *Attorney, Agent, or Firm* — John D. DeLong

(57) ABSTRACT

The invention is directed to functionalized aluminum reagents of formula 1

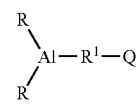

1 where R is a linear or branched alkane group containing 1 to 8 carbon atoms, and $R^1$ is phenylene, or a linear or branched alkane diyl group containing 2 to 10 carbon atoms, or a combination of one or more phenylene groups and one or more linear or branched alkane diyl groups containing 1 to 10 carbon atoms; Q is of formula 2

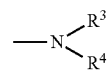

2 where $R^3$ and $R^4$ are independently phenyl or a linear or branched alkyl group containing 1 to 10 carbon atoms, or $R^3$ and $R^4$ taken together with the nitrogen atom represent a nitrogen containing heterocyclic group containing from 4 to 12 carbon atoms.

7 Claims, No Drawings

(56) References Cited

OTHER PUBLICATIONS

Hannes Leicht et al, Stereoselective Copolymerization of Butadiene and Functionalized 1,3-Dienes, Stereoselective Copolymerization of Butadiene and Functionalized 1,3-Dienes, Jun. 9, 2016 (Jun. 9, 2016), 777-780, vol. 5, No. 6, ACS Macro Letters, Konstanz, DE.
Jian, et al., Living catalyzed-chain-growth polymerization and block copolymerization of isoprene by rare-earth metal allyl precursors bearing a constrained-geometry-conformation ligand, The Royal Society of Chemistry 2010, Mar. 25, 2010, pp. 3022-3024, 46, Chem. Commun.
Kaita, et al., Ultimately Specific 1,4-cis Polymerization of 1,3-Butadiene with a Novel Gadolinium Catalyst, Macromol. Rapid Commun., 2003, pp. 179-184, 24, No. 2, Wiley-VCH Verlag GmbH & Co. KGaA
Makio, et al., Synthesis of Telechelic Olefin Polymers via Catalyzed Chain Growth on Multinuclear Alkylene Zinc Compounds, Journal of the American Chemical Society, 2013, pp. 8177-8180, 135, ACS Publication.
May, et al., Formation of Vinyl-, Vinylhalide- or Acyl-Substituted Quaternary Carbon Stereogenic Centers through NHC—Cu-Catalyzed Enantioselective Conjugate Additions of Si-Containing Vinylaluminums to β-Substituted Cyclic Enones, Department of Chemistry, Merkert Chemistry Center, Dec. 20, 2010, pp. 736-739, 133, J. Am. Chem. Soc. 2011.

Mei, et al., Enantioselective construction of remote quaternary stereocentres, Nature, Apr. 17, 2014, pp. 340-344, vol. 508.
Müller, et al., New Experimental Conditions for Tandem hydroalumination/Cu-Catalyzed Asymmetric Conjugate Additions to β-Substituted Cyclic Enones, Organic Letters, Department of Organic Chemistry, University of Geneva 30, May 18, 2011, pp. 3040-3043, vol. 13, No. 12, American Chemical Society.
Norsic, et al., Divinyl-End-Functionalized Polyethylenes: Ready Access to a Range of Telechelic Polyethylenes through Thiol-Ene Reactions, Derivatization of Polymers, Angew. Chem. Int. Ed. 2015, 2015, pp. 4631-4635, 54, Wiley-VCH Verlag GmbH & Co. KGaA, Weinheim.
Ottou, et al., Amino End-Functionalized Polyethylenes and Corresponding Telechelics by Coordinative Chain Transfer Polymerization, Macromolecules, Oct. 17, 2017, pp. 8372-8377, 50, ACS Publications.
Sonnek, Aluminiumalkyle mit Heteroatomen, Journal of Organometallic Chemistry, 1987, pp. 31-41, 329, Elsevier Sequoia S.A., Lausanne, The Netherlands.
Valente et al., Coordinative Chain Transfer Polymerization, Chem. Rev. 2013, 113, Feb. 7, 2013, pp. 3836-3857, ACS Publications, American Chemical Society.
Xu, et al., Zirconium-Catalyzed Asymmetric Carboalumination of Unactivated Terminal Alkenes, Acc. Chem. Res., ACS Publications, Sep. 29, 2016, pp. 2158-2168, 49, Herbert C. Brown Laboratories of Chemistry, Purdue University.

\* cited by examiner

FUNCTIONALIZED ALUMINUM REAGENTS

BACKGROUND

Coordinative chain transfer polymerization (CCTP) using main group metals, i.e., a reversible chain transfer of polymeryl chains between chain growth active metal centers and chain growth inactive metal centers, has become an important strategy in insertion polymerization to reduce the amount of polymerization catalysts, to control the molecular weight and molecular weight distribution of polymers as well as to introduce chain end-functionalization by appropriate quenching of main group metal polymeryls. See Valente et al., Chem. Rev. 2013, 113, 3836-3857; Jian et al., Chem. Commun. 2010, 46, 3022-3024; German et al., Angew. Chem. Int. Ed. 2013, 52, 3438-3441. (b) Norsic et al., Angew. Chem. Int. Ed. 2015, 54, 4631-4635; Makio et al., J. Am. Chem. Soc. 2013, 135, 8177-8180.

Most commonly, commercially available un-functionalized aluminum and zinc alkyls have been employed, with zinc alkyls much better performing in terms of transfer efficiency and thus molecular weight control. With respect to heteroatom-functionalized main group metal alkyls, recently homoleptic di(ω-aminoalkyl) magnesium reagents have been used as chain transfer reagents to yield end functionalized amino polyethylenyl magnesiums (Ottou et al., Macromolecules 2017, 50, 8372-8377). Functionalized magnesium reagents were also employed to initiate polybutadiene chain growth to end-functionalized high trans polybutadiene (Leicht et al., Macromolecules 2018, 51, 763-770.), or with increased chain transfer numbers, to functionalized polybutadienes of less uniform stereochemistry (WO201013945).

In contrast, both in organic synthesis and in polymer chemistry, heteroatom-functionalized aluminum reagents have scarcely been used as synthetically useful reactants for the transfer of functional group substituted carbon nucleophiles probably owing to drawbacks in the synthesis of homoleptic aluminum alkyls or the expectedly low chemoselectivity of mixed aluminum alkyls (Xu et al., Acc. Chem. Res. 2016, 49, 2158-2168; Gao et al., J. Am. Chem. Soc., 2010, 132, 10961-10963; May et al., Org. Lett., 2011, 13, 3040-3043.)

SUMMARY

The present invention is directed to functionalized aluminum reagents of formula 1

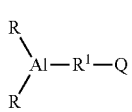

where R is a linear or branched alkane group containing 1 to 8 carbon atoms, and $R^1$ is phenylene, or a linear or branched alkane diyl group containing 2 to 10 carbon atoms, or a combination of one or more phenylene groups and one or more linear or branched alkane diyl groups containing 1 to 10 carbon atoms; Q is of formula 2

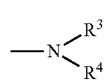

where $R^3$ and $R^4$ are independently phenyl or a linear or branched alkyl group containing 1 to 10 carbon atoms, or $R^3$ and $R^4$ taken together with the nitrogen atom represent a nitrogen containing heterocyclic group containing from 4 to 12 carbon atoms.

The invention is further directed to a method of making functionalized aluminum reagents.

DESCRIPTION

There are disclosed functionalized aluminum reagents of formula 1

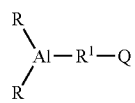

where R is a linear or branched alkane group containing 1 to 8 carbon atoms, and $R^1$ is phenylene, or a linear or branched alkane diyl group containing 2 to 10 carbon atoms, or a combination of one or more phenylene groups and one or more linear or branched alkane diyl groups containing 1 to 10 carbon atoms; Q is of formula 2

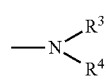

where $R^3$ and $R^4$ are independently phenyl or a linear or branched alkyl group containing 1 to 10 carbon atoms, or $R^3$ and $R^4$ taken together with the nitrogen atom represent a nitrogen containing heterocyclic group containing from 4 to 12 carbon atoms.

There is further disclosed a method of making functionalized aluminum reagents.

Functionalized aluminum reagents of formula 1 and 2 may be produced by reaction of a compound of formula 3 with a dialkyl aluminum hydride of formula 4

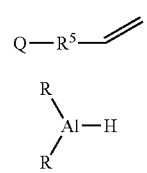

where $R^5$ is phenylene, or a linear or branched alkane diyl group containing 1 to 9 carbon atoms, or a combination of one or more phenylene groups and one or more linear or branched alkane diyl groups containing 1 to 10 carbon atoms, and R is as previously defined.

The reaction of the compounds of formulas 3 and 4 may be done neat at a temperature ranging from 25 to 75 C for 12 to 36 hours. Optionally, the reaction may proceed in a hydrocarbon solvent in the presence of a neodymium (III) catalyst.

In one embodiment, the compound of formula 4 is diisobutyl aluminum hydride (DIBAL-H).

In various embodiment, the functionalized aluminum reagent of formula 1 may be one of the following compounds 1a-1l.

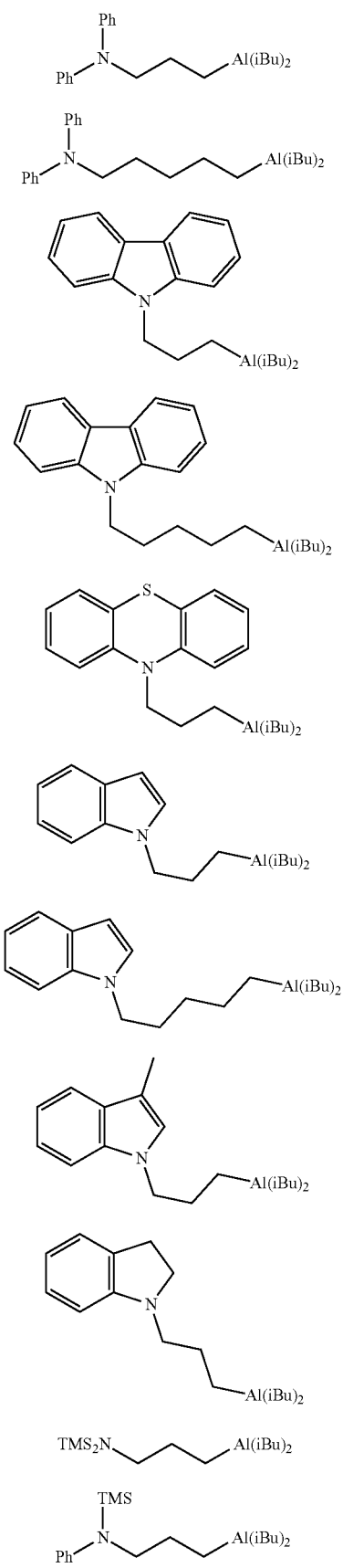

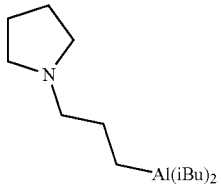

The functionalized aluminum reagents are useful, for example, as activators for lanthanide-based catalysts in polymerization of conjugated dienes.

The invention is further illustrated by the following non-limiting examples.

Example 1

(3-Diphenylaminopropyl)diisobutyl Aluminum (1a)

N,N-Diphenyl-N-allylamine (418 mg, 2 mmol), DIBAL-H (327 mg, 2.3 mmol), Nd(versatate)$_3$ (163 mg solution in hexanes, 100 μmol, 5 mol %), and 92 mg C$_6$D$_6$ were combined in an 8 mL screw-cap vial and stirred for 14 h at 323 K. The resulting solution contains 1 μmol Nd and ca 20 μmol of (3-Diphenylaminopropyl)diisobutyl aluminum (1a) per 10 mg solution and was used without further purification.

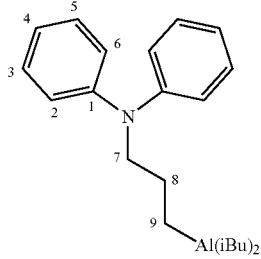

$^1$H NMR (400 MHz, C$_6$D$_6$, 300 K): δ 7.06 (m, 4H, 2- and 6-H), 6.93 (m, 4H, 3- and 5-H), 6.83 (m, 2H, 4-H), 3.02 (t, $^3J_{HH}$=6.0 Hz, 2H, 7-H$_2$), 2.03 (n, $^3J_{HH}$=6.6 Hz, 2H, 2×(CH$_3$)$_2$CHCH$_2$Al), (1.76 (m, 2H, 8-H$_2$), 1.18 (d, $^3J_{HH}$=6.6 Hz, 12H, 2×(CH$_3$)$_2$CHCH$_2$Al), 0.53 (m, 2H, 9-H$_2$), 0.11 (d, $^3J_{HH}$=6.6 Hz, 4H, 2×(CH$_3$)$_2$CHCH$_2$Al). $^{13}$C NMR (100 MHz, C$_6$D$_6$, 300 K): δ 149.84 (C$_q$, C1), 129.04 (CH, C3 and C5), 126.56 (CH, C4), 124.80 (CH, C2 and C6), 60.51 (C7), 28.69 (2×(CH$_3$)$_2$CHCH$_2$Al), 27.13 (2×(CH$_3$)$_2$CHCH$_2$Al), 24.90 (2×(CH$_3$)$_2$CHCH$_2$Al), 22.04 (C8), 3.75 (C9).

Example 2

(5-Diphenylaminopentyl)diisobutyl Aluminum (1b)

N,N-Diphenyl-N-pent-4-enylamin (475 mg, 2 mmol), and DIBAL-H (291 mg, 2.05 mmol) were combined in a 8 mL screw-cap vial and stirred for 14 h at 323 K after which 1b had formed in ca 93% along with traces of isobutene.

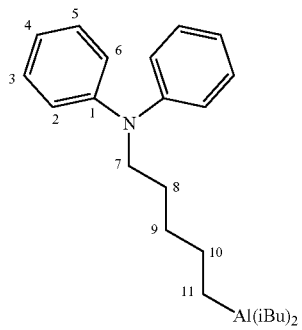

$^1$H NMR (400 MHz, C$_6$D$_6$, 300 K): δ 7.11 (m, 4H, 3- and 5-H), 7.01 (m, 4H, 2- and 6-H), 6.83 (m, 2H, 4-H), 3.54 (t, $^3J_{HH}$=7.3 Hz, 2H, 7-H$_2$), 1.95 (m, 2H, 2×(CH$_3$)$_2$CHCH$_2$Al), (1.63 (m, 2H, 8-H$_2$), 1.49 (m, 2H, 10-H$_2$), 1.31 (m, 2H, 9-H$_2$), 1.03 (d, $^3J_{HH}$=7.2 Hz, 12H, 2×(CH$_3$)$_2$CHCH$_2$Al), 0.3 (br, 6H, 11-H$_2$ and 2×(CH$_3$)$_2$CHCH$_2$Al). $^{13}$C NMR (100 MHz, C$_6$D$_6$, 300 K): δ 148.72 (C6), 129.51 (C3 and C5), 121.91 (C4), 121.42 (C2 and C6), 53.23 (C7), 33.13 (C9), 28.27 (2×(CH$_3$)$_2$CHCH$_2$Al), 27.21 (C8), 26.43 (2×(CH$_3$)$_2$CHCH$_2$Al), 25.56 (C10), 23.99 (br, 2×(CH$_3$)$_2$CHCH$_2$Al), 11.52 (br, C11).

Example 3

(3-(9H-carbazol-9-yl)propyl)diisobutyl Aluminum (1c)

N-Allylcarbazole (2073 mg, 10 mmol), and DIBAL-H (1500 mg, 10.5 mmol) were combined in a 8 mL screw-cap vial and stirred for 16 h at 323 K after which 1c had formed >95% along with traces of isobutene. 1c was alternatively prepared within 24 h at 298 K in the presence of 5 mol % Nd(versatate)$_3$.

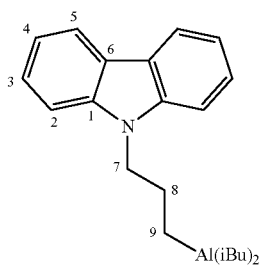

$^1$H NMR (400 MHz, C$_6$D$_6$, 300 K): δ 7.68 (m, 2H, 2-H), 7.19 (m, 2H, 4-H), 7.09 (m, 4H, 3- and 5-H), 3.40 (t, $^3J_{HH}$=6.6 Hz, 2H, 7-H$_2$), 1.80 (m, 2H, 8-H$_2$), 1.71 (m, 2H, 2×(CH$_3$)$_2$CHCH$_2$Al), 0.91 (d, $^3J_{HH}$=6.4 Hz, 12H, 2×(CH$_3$)$_2$CHCH$_2$Al), 0.06 (m, 2H, 9-H$_2$), −0.16 (m br, 4H, 2×(CH$_3$)$_2$CHCH$_2$Al). $^{13}$C NMR (100 MHz, C$_6$D$_6$, 300 K): δ 145.30 (C1), 126.68 (C4), 126.43 (C6), 122.17 and 112.85 (C3 and C5), 120.71 (C2), 53.88 (C7), 28.24 (2×(CH$_3$)$_2$CHCH$_2$Al), 26.24 (2×(CH$_3$)$_2$CHCH$_2$Al), 25.92 (C8), 24.40 (2×(CH$_3$)$_2$CHCH$_2$Al), 8.36 (C9).

Example 4

(5-(9H-carbazol-9-yl)pentyl)diisobutyl Aluminum (1d)

N-Pent-4-enylcarbazole (1177 mg, 5 mmol), and DIBAL-H (780 mg, 5.48 mmol) were combined in a 8 mL screw-cap vial and stirred for 16 h at 323 K after which 1d had formed >95% along with traces of isobutene. 1d was alternatively prepared within 4 h at 343K, or within 24 h at 298K in presence of 5 mol % Nd(versatate)$_3$.

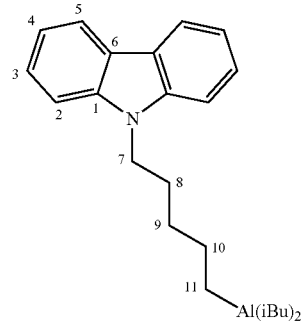

$^1$H NMR (400 MHz, C$_6$D$_6$, 300 K): δ 8.01 (m, 2H, 2-H), 7.37 (m, 2H, 4-H), 7.18 (m, 4H, 3- and 5-H), 3.81 (t, $^3J_{HH}$=6.8 Hz, 2H, 7-H$_2$), 1.90 (m, 2H, 2×(CH$_3$)$_2$CHCH$_2$Al), 1.56 (m, 2H, 8-H$_2$), 1.22 (m, 2H, 10-H$_2$), 1.14 (m, 2H, 9-H$_2$) 1.02 (d, $^3J_{HH}$=6.4 Hz, 12H, 2×(CH$_3$)$_2$CHCH$_2$Al), 0.21 (m, 4H, 4H, 2×(CH$_3$)$_2$CHCH$_2$Al), 0.35 (m br, 11-H$_2$). $^{13}$C NMR (100 MHz, C$_6$D$_6$, 300 K): δ 140.93 (C1), 125.90 (C4), 123.48 (C6), 120.79 (C2), 119.14 and 109.06 (C3 and C5), 42.92 (C7), 33.23 (C9), 28.73 (C8), 28.26 (2×(CH$_3$)$_2$CHCH$_2$Al), 26.30 (2×(CH$_3$)$_2$CHCH$_2$Al), 25.37 (C10), 24.8 (v br, 2×(CH$_3$)$_2$CHCH$_2$Al), 12.12 (C11).

Example 5

(3-(10H-phenothiazin-10-yl)propyl)diisobutyl Aluminum (1e)

N-Allylphenothiazin (1197 mg, 5 mmol), and DIBAL-H (700 mg, 4.92 mmol), and C$_6$D$_6$ (603 mg) were combined in a 8 mL screw-cap vial and stirred for 16 h at 323 K after which 1d had formed >90%. The resulting solution contains 20 μmol 1e per 10 mg solution.

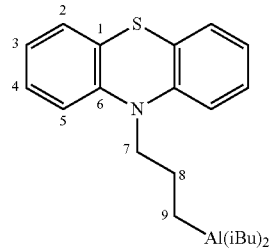

$^1$H NMR (400 MHz, C$_6$D$_6$, 300 K): δ 7.07, 6.87, and 6.69 (m:m:m, 2:2:4H, 2-H to 5-H), 3.45 (t, $^3J_{HH}$=5.2 Hz, 7-H$_2$), 2.00 (m, 2H, 8-H$_2$), 1.80 (m, 2H, 2×(CH$_3$)$_2$CHCH$_2$Al), 1.02 (br, 12H, 2×(CH$_3$)$_2$CHCH$_2$Al), 0.24 (t, $^3J_{HH}$=6.8 Hz, 9-H$_2$), −0.03 (br, 2×(CH$_3$)$_2$CHCH$_2$Al). $^{13}$C NMR (100 MHz, C$_6$D$_6$, 300 K): δ 146.02 and 122.78 (C1 and C6), 128.92, 128.24, 124.77, and 118.41 (C2-C5), 53.80 (C7), 28.49 (2×(CH$_3$)$_2$CHCH$_2$Al), 26.93 (2×(CH$_3$)$_2$CHCH$_2$Al), 25.18 (2×(CH$_3$)$_2$CHCH$_2$Al), 24.70 (C8), 8.93 (C9).

Example 6

(3-(1H-indol-1-yl)propyl)diisobutyl Aluminum (1f)

N-Allylindol (1572 mg, 10 mmol), and DIBAL-H (1480 mg, 10.4 mmol) were combined in a 8 mL screw-cap vial and stirred for 16 h at 323 K after which 1f had formed >95%.

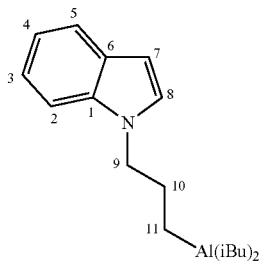

$^1$H NMR (400 MHz, C$_6$D$_6$, 300 K): δ 7.51, 7.14, and 7.05 (m each, 1:1:2H, 2-H to 5-H), 6.67 and 6.42 (br each, 1:1H, 7-H and 8-H), 3.43 (m br, 2H, 9-H$_2$), 1.79 (m br, 2H, 2×(CH$_3$)$_2$CHCH$_2$Al), 1.59 (m br, 10-H$_2$), 0.98 (d, $^3J_{HH}$=6.4 Hz, 12H, 2×(CH$_3$)$_2$CHCH$_2$Al), −0.09 (br, 6H, 11-H$_2$ and 2×(CH$_3$)$_2$CHCH$_2$Al). $^{13}$C NMR (100 MHz, C$_6$D$_6$, 300 K): δ 139.08 and 129.96 (C1 and C6), 126.48 and 105.28 (C7 and C8), 124.80, 122.45, 121.28, and 110.93 (C2-C5), 50.83 (C9), 28.30 (2×(CH$_3$)$_2$CHCH$_2$Al), 26.38 (2×(CH$_3$)$_2$CHCH$_2$Al), 26.13 (C10), 24.51 (2×(CH$_3$)$_2$CHCH$_2$Al), 9.82 (C11).

Example 7

(5-(1H-indol-1-yl)pentyl)diisobutyl Aluminum (1g)

N-Pent-4-enylindol (927 mg, 5 mmol), and DIBAL-H (720 mg, 5.06 mmol) were combined in a 8 mL screw-cap vial and stirred for 16 h at 323 K after which 1g had formed >95%.

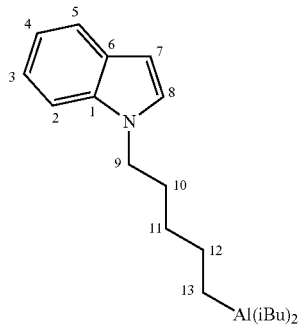

$^1$H NMR (400 MHz, C$_6$D$_6$, 300 K): δ 7.69 and 7.17 (m each, 1:3H, 2-H to 5-H), 6.90 and 6.45 (br each, 1:1H, 7-H and 8-H), 3.61 (m, 2H, 9-H$_2$), 1.92 (m, 2H, 2×(CH$_3$)$_2$CHCH$_2$Al), 1.54 (m, 2H, 10-H$_2$), 1.28 (m br, 2H, 12-H$_2$), 1.14 (m br, 2H, 11-H$_2$), 1.05 (d, $^3J_{HH}$=6.8 Hz, 12H, 2×(CH$_3$)$_2$CHCH$_2$Al), 0.20 (m br, 4H, 2×(CH$_3$)$_2$CHCH$_2$Al), −0.06 (m br, 2H, 13-H$_2$). $^{13}$C NMR (100 MHz, C$_6$D$_6$, 300 K): δ 137.10 and 129.66 (C1 and C6), 130.85 and 97.85 C7 and C8), 122.40, 121.74, 120.39, and 110.12 (C2-C5), 46.63 (C9), 33.02 (C11), 29.75 (C10), 28.37 (2×(CH$_3$)$_2$CHCH$_2$Al), 26.48 (2×(CH$_3$)$_2$CHCH$_2$Al), 25.54 (C12), 24.59 (2×(CH$_3$)$_2$CHCH$_2$Al), 11.65 (C13).

Example 8

(3-(3-methyl-1H-indol-1-yl)propyl)diisobutyl Aluminum (1h)

N-Allyl-3-methylylindol (856 mg, 5 mmol), and DIBAL-H (720 mg, 5.06 mmol) were combined in a 8 mL screw-cap vial and stirred for 16 h at 323 K after which 1g had formed >95%.

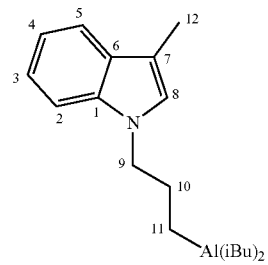

$^1$H NMR (400 MHz, C$_6$D$_6$, 300 K): δ 7.33, 7.09, and 7.05 (m each, 1:1:2H, 2H to 5-H), 6.37 (s, 1H, 8-H), 3.31 (t, $^3J_{HH}$=6.2 Hz, 9-H$_2$), 2.06 (s, 3H, 12-H$_3$), 1.79 (m br, 2H, 10-H$_2$), 1.71 (m br, 2H, 2×(CH$_3$)$_2$CHCH$_2$Al), 0.91 (d, $^3J_{HH}$=6.8 Hz, 12H, 2×(CH$_3$)$_2$CHCH$_2$Al), 0.11 (m br, 2H, 11-H$_2$), −0.20 (m br, 4H, 2×(CH$_3$)$_2$CHCH$_2$Al). $^{13}$C NMR (100 MHz, C$_6$D$_6$, 300 K): δ 141.96 and 131.60 (C1 and C6), 124.6, 121.89, 120.43, and 112.47 (cC2-C5 and C8), 109.7 (C7), 52.44 (C9), 28.37 (2×(CH$_3$)$_2$CHCH$_2$Al), 26.40 (2×(CH$_3$)$_2$CHCH$_2$Al), 25.80 (C10), 23.73 (2×(CH$_3$)$_2$CHCH$_2$Al), 9.98 (C12), 8.77 (C11).

Example 9

(3-(indolin-1-yl)propyl)diisobutyl Aluminum (1i)

N-Allylindolin (796 mg, 4 mmol) and DIBAL-H (595 mg, 4.18 mmol) were combined in a 8 mL screw-cap vial and stirred for 16 h at 343 K after which 1i had formed >90%. Due to coordination of aluminum to the nitrogen atom, 7-11-CH$_2$ exhibit diastereotopic protons, likewise the iBu groups become fully diastereotopic.

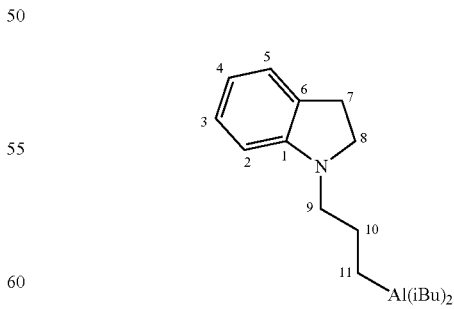

$^1$H NMR (400 MHz, C$_6$D$_6$, 300 K): δ 6.94 and 6.87 (m each, 1:2H, 3-, 4-, and 5-H), 6.78 (m, 1H, 2-H), 3.54 and 2.24 (m each, 1:1H, 8-H$_2$), 3.06 and 2.24 (m each, 1:1H, 9-H$_2$), 2.79 and 2.42 (m each, 1:1H, 7-H$_2$), 1.98 and 1.61 (m each, 1:1H, 10-H$_2$), 1.98 and 1.76 (2×(CH$_3$)$_2$CHCH$_2$Al), 1.10, 1.06, 0.99, and 0.86 (d each, $^3J_{HH}$=6.4 Hz, 12H, 2×(CH$_3$)$_2$CHCH$_2$Al), 0.29 (m, 2H, 11-H$_2$), −0.06 and −0.25 (m each, 2:2H, 2×(CH$_3$)$_2$CHCH$_2$Al). $^{13}$C NMR (100 MHz, C$_6$D$_6$, 300K): δ 149.11 (C1), 133.52 (C6), 127.26, 125.71, and 125.24 (C3-C5), 117.06 (C2), 63.03 (C9), 57.97 (C8), 28.87, 28.84, 28.78, 28.74, and 28.41 (2×(CH$_3$)$_2$CHCH$_2$Al and C7), 27.27 and 26.92 (2×(CH$_3$)$_2$CHCH$_2$Al), 23.51 (C10), 23.41 and 23.06 (2×(CH$_3$)$_2$CHCH$_2$Al), 4.58 (C11).

Example 11

(3-(phenyl(trimethylsilyl)amino)propyl)diisobutyl Aluminum (1k)

N-Allyl-N-phenyl-N-trimethylsilyamine (1097 mg, 5 mmol), DIBAL-H (782 mg, 5.5 mmol), Nd(versatate)$_3$ (407 mg solution in hexanes, 250 µmol), and 214 mg C$_6$D$_6$ were combined in a 8 mL screw-cap vial and stirred for 16 h at 343 K after which 1k had formed ca 95%. The solution contains 1 µmol Nd and ca 20 µmol 1k per 10 mg solution.

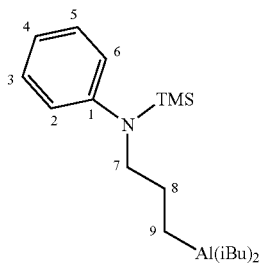

$^1$H NMR (400 MHz, C$_6$D$_6$, 300 K): δ 6.95 and 6.85 (m each, 4:1H, 2-H to 5-H), 2.98 (t, $^3J_{HH}$=6.4 Hz, 7-H$_2$), 2.05 (m, 2H, 2×(CH$_3$)$_2$CHCH$_2$Al), 1.91 (m, 2H, 8-H$_2$), 1.16 (d, $^3J_{HH}$=6.4 Hz, 2×(CH$_3$)$_2$CHCH$_2$Al), 0.39 (m, 2H, 9-H$_2$), 0.22 (m br, 4H, 2×(CH$_3$)$_2$CHCH$_2$Al), −0.02 (s, 9H, TMS). $^{13}$C NMR (100 MHz, C$_6$D$_6$, 300K): δ 145.75 (C1), 128.37, 125.48, and 124.99 (C2-C5), 54.74 (C7), 28.75 (2×(CH$_3$)$_2$CHCH$_2$Al), 27.21 (2×(CH$_3$)$_2$CHCH$_2$Al), 26.00 (2×(CH$_3$)$_2$CHCH$_2$Al), 23.13 (C8), 3.28 (C9), 0.18 (TMS).

Example 12

(3-(pyrrolidin-1-yl)propyl)diisobutyl Aluminum (1l)

N-Allylpyrrolidin (556 mg, 5 mmol), DIBAL-H (740 mg, 5.2 mmol), Nd(versatate)$_3$ (163 mg solution in hexanes, 100 µmol, 2 mol %) were combined in a 8 mL screw-cap vial and stirred for 20 h at 343 K after which 1j had formed in ca 95%. Due to coordination of aluminum to the nitrogen atom, 1- and 2-CH$_2$ as well as (CH$_3$)$_2$CHCH$_2$Al exhibit diastereotopic protons.

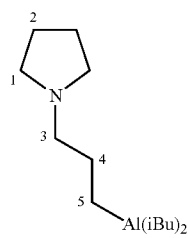

$^1$H NMR (400 MHz, C$_6$D$_6$, 300 K): δ 2.85 and 1.84 (m each, 2:2H, 2×1-H$_2$), 2.17 (t, $^3J_{HH}$=6.0 Hz, 3-H$_2$), 1.95 (2×(CH$_3$)$_2$CHCH$_2$Al), 1.60 (m, 2H, 4-H$_2$), 1.48 and 1.34 (m each, 2:2H, 2×2-H$_2$), 1.08 (d, 3J$_{HH}$=7.6 Hz, 2×(CH$_3$)$_2$CHCH$_2$Al), 0.133 (t, $^3J_{HH}$=7.6 Hz, 5-H$_2$), −0.03 and −0.12 (dd each, $^2J_{HH}$=14.0 Hz, $^3J_{HH}$=7.6 Hz, 2×(CH$_3$)$_2$CHCH$_2$Al). $^{13}$C NMR (100 MHz, C$_6$D$_6$, 300K): δ 62.55 (C3), 54.98 (C1), 28.96 (2×(CH$_3$)$_2$CHCH$_2$Al), 27.35 (2×(CH$_3$)$_2$CHCH$_2$Al), 24.00 (C4), 23.00 (2×(CH$_3$)$_2$CHCH$_2$Al), 22.86 (C2), 4.66 (C5).

The invention claimed is:

1. A functionalized aluminum reagent of formula 1

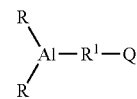

wherein R is a linear or branched alkane group containing 1 to 8 carbon atoms, and R$^1$ is phenylene, or a linear or branched alkane diyl group containing 2 to 10 carbon atoms, or a combination of one or more phenylene groups and one or more linear or branched alkane diyl groups containing 1 to 10 carbon atoms; Q is of formula 2

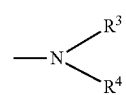

wherein R$^3$ and R$^4$ are independently phenyl or a linear or branched alkyl group containing 1 to 10 carbon atoms, or R$^3$ and R$^4$ taken together with the nitrogen atom represent a nitrogen containing heterocyclic group containing from 4 to 12 carbon atoms; wherein the functionalized aluminum reagent of formula 1 is selected from the group consisting of

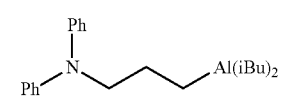

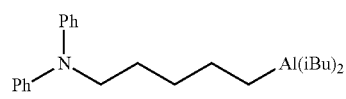

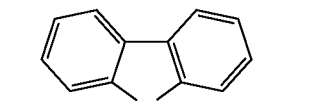

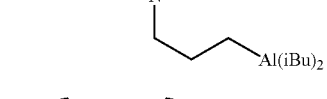

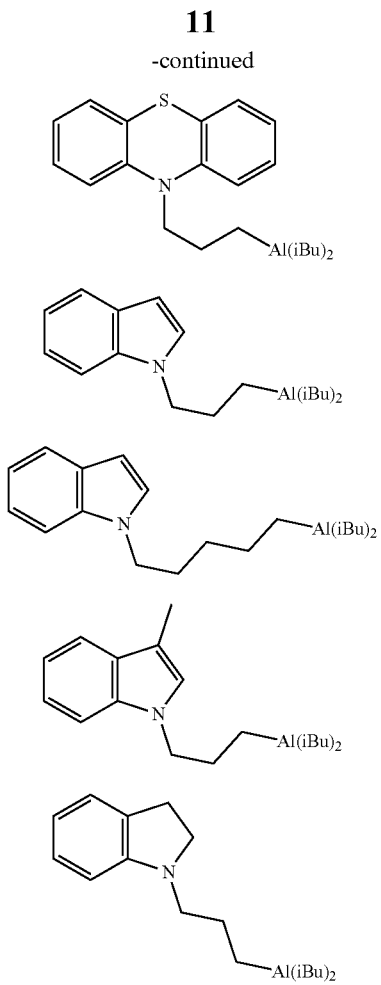

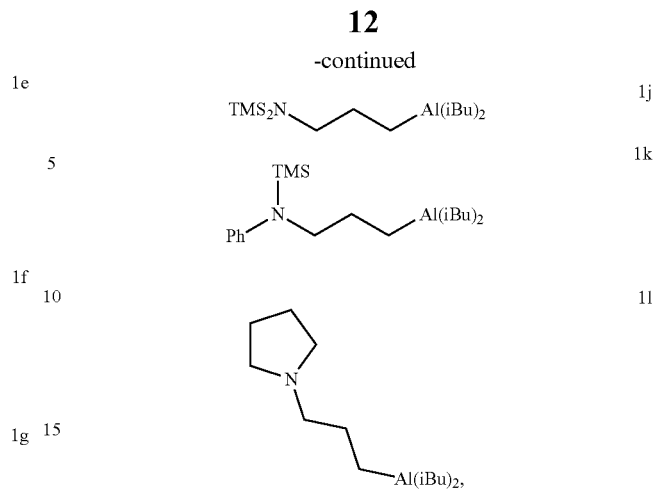

wherein TMS is a trimethylsilyl group.

2. The functionalized aluminum reagent of claim 1 selected from the group consisting of structures 1a and 1b.

3. The functionalized aluminum reagent of claim 1 selected from the group consisting of structures 1c and 1d.

4. The functionalized aluminum reagent of claim 1 having the structure 1e.

5. The functionalized aluminum reagent of claim 1 selected from the group consisting of structures 1f, 1g, 1h and 1i.

6. The functionalized aluminum reagent of claim 1 selected from the group consisting of structures 1j and 1k.

7. The functionalized aluminum reagent of claim 1 having the structure 1l.

* * * * *